United States Patent
Haddish (10) Patent No.: US 11,694,565 B2
(45) Date of Patent: Jul. 4, 2023

(54) VIRTUAL AND AUGMENTED REALITY INSTRUCTION SYSTEM

(71) Applicant: Imran Haddish, Chino Hills, CA (US)

(72) Inventor: Imran Haddish, Chino Hills, CA (US)

(*) Notice: Subject to any disclaimer, the term of this patent is extended or adjusted under 35 U.S.C. 154(b) by 597 days.

(21) Appl. No.: 17/269,969

(22) PCT Filed: Nov. 29, 2013

(86) PCT No.: PCT/US2013/072493
§ 371 (c)(1),
(2) Date: Feb. 19, 2021

(87) PCT Pub. No.: WO2014/085768
PCT Pub. Date: Jun. 5, 2014

(65) Prior Publication Data
US 2022/0415197 A1  Dec. 29, 2022

Related U.S. Application Data (60) Provisional application No. 61/792,771, filed on Mar. 15, 2013, provisional application No. 61/731,111, filed on Nov. 29, 2012.

(51) Int. Cl.
*G09B 5/06* (2006.01)
*G02B 27/01* (2006.01)
(Continued)

(52) U.S. Cl.
CPC ......... *G09B 5/065* (2013.01); *G02B 27/0172* (2013.01); *G06F 1/163* (2013.01); *G06F 3/011* (2013.01); *G02B 2027/014* (2013.01); *G02B 2027/0138* (2013.01); *G02B 2027/0141* (2013.01); *G02B 2027/0178* (2013.01);
(Continued)

(58) Field of Classification Search
USPC .......................................................... 434/36
See application file for complete search history.

(56) References Cited

U.S. PATENT DOCUMENTS

2009/0058850 A1* 3/2009 Fun ..................... G06F 3/04815
345/419
2009/0319058 A1* 12/2009 Rovaglio ............... G05B 17/02
715/848
(Continued)

*Primary Examiner* — Chineyere D Wills-Burns
(74) *Attorney, Agent, or Firm* — Kevin Schraven; Anooj Patel; Hankin Patent Law APC (57) ABSTRACT

A virtual and augmented reality instruction system may include a complete format and a portable format. The complete format may include a board system to capture all movement (including writing and erasing) on the board's surface, and a tracking system to capture all physical movements. The portable format may include a touch-enabled device or digital pen and a microphone, and is designed to capture a subset of the data captured by the complete format. In one embodiment of the complete format, the board system and the tracking system can communicate with each other through a network, and control devices (such as a laptop, desktop, mobile phone and tablet) can be used to control the board system and tracking system through the network. In further embodiments of the complete format, augmented reality can be achieved within the tracking system through the combination of 3D sensors and see through augmented reality glasses.

12 Claims, 11 Drawing Sheets

(51) Int. Cl.
    *G06F 1/16*      (2006.01)
    *G06F 3/01*      (2006.01)
    *G06F 3/0354*    (2013.01)
    *G06F 3/041*     (2006.01)
    *G09B 7/02*      (2006.01)
    *G06F 3/038*     (2013.01)
    *G06F 3/042*     (2006.01)
    *G06F 3/043*     (2006.01)
    *G06F 3/0346*    (2013.01)

(52) U.S. Cl.
    CPC .......... *G06F 3/03545* (2013.01); *G06F 3/041* (2013.01); *G09B 7/02* (2013.01)

(56) References Cited

U.S. PATENT DOCUMENTS

| | | | | |
|---|---|---|---|---|
| 2010/0149093 | A1* | 6/2010 | Edwards | G06F 3/013 |
| | | | | 705/27.2 |
| 2013/0182858 | A1* | 7/2013 | You | G06F 3/167 |
| | | | | 381/58 |
| 2013/0249947 | A1* | 9/2013 | Reitan | G06T 19/006 |
| | | | | 345/633 |
| 2014/0214629 | A1* | 7/2014 | Azam | G06Q 30/0643 |
| | | | | 705/27.2 |
| 2015/0116316 | A1* | 4/2015 | Fitzgerald | G02B 27/01 |
| | | | | 345/419 |

* cited by examiner

VIRTUAL AND AUGMENTED REALITY INSTRUCTION SYSTEM

FIELD OF THE INVENTION

The present invention relates to a virtual re-creation of an instructional session through a virtual and augmented reality instruction system, and more particularly to a system designed to capture the activities of an individual's speech, movement, and handwriting.

BACKGROUND OF THE INVENTION

In the field of education, classes have been offered online through the use of static media such as videos. These videos have been used to flip classrooms, reinforce prior concepts, and educate individuals without access to classrooms from primary school to university. The videos are pre-recorded lectures or seminars which are made available online for an individual to view at their convenience.

The use of videos results in each individual accessing the same content. Due to their nature, videos do not provide sufficient quantifiable or manipulable data that can be used to create dynamic media. Consequently, there is no means to serve individual users with content specific to their needs.

The distribution of static media online usually comes with a high cost, in regards to most users. The amount of bandwidth needed to stream a video is resolution-dependent therefore as video quality increases, the cost to the user increases. This leads to mobile users not having a viable means of unrestricted access to educational contents.

In order to overcome the challenges of static media, an event-driven system is needed. Such a system records an environment through the events that take place within it. This results in the generation of quantifiable and manipulable data at a small, fixed bandwidth cost. This is achieved by rendering the environment on the user's computer based on the events transmitted online.

SUMMARY OF THE INVENTION

It is an object of the present invention to provide a virtual and augmented reality instruction system to capture the activities of an individual's speech, movement, and handwriting.

It is another object of the present invention to provide a virtual and augmented reality instruction system that can be used in a virtual learning environment to virtually re-create a classroom or any kind of training session.

In one aspect of the present invention, a complete interactive information input and retrieval system may include a board system to capture all movements on the board's surface, and a tracking system to capture all physical movements. In one embodiment, the board system and tracking system can be used either individually or separately. The board system and the tracking system can communicate with each other through a network, and a control device (such as a laptop, desktop, mobile phone and tablet) can be used to control the board system and tracking system through the network.

In another embodiment, the board system may include one or more board units, and a tracking region may be defined in a predetermined distance from the board unit(s). More particularly, the tracking region is the total area where the tracking system can track individual(s) or objects in front of the board unit(s). In an exemplary embodiment, each tracking unit of the tracking system is equipped with at least one 3D sensor, each of which communicates with each other through the network and is used to track the movement and speech of each individual in the tracking region. The sensors are configured to track the skeletons of each individual and map the environment of the tracking region. In other embodiments, the tracking system can also track motion that is not part of the individual's skeleton.

In the following four embodiments, the following configurations can be attached to the board unit to detect movement (including writing and erasing) on the board's surface:

A scanning laser configuration
An ultrasonic configuration
An infrared configuration
A 3D (three-dimensional) sensor configuration In another embodiment, the tracking system can be operated with see-through augmented reality glasses to enable the user to manipulate virtual objects using physical movement. More specifically the tracking system can fix the virtual objects to the user's location to allow easy manipulation or allow the object to be fixed or move independently of the user's location in virtual space. In a further embodiment, the user can supplement the tracking system with wearable motion controllers or markers to enable finer motion control.

In another aspect of the present invention, a portable interactive information input and retrieval system may include a touch-screen display, as part of a computing device, or a digital pen to capture all movements on the device's surface. In this aspect, the digital pen or touch-screen display are the only components and are not accompanied by a tracking system or board system. Therefore the physical environment can be generated dynamically based on user preference and user tracking is interpolated based on the movements on the device's surface.

In a further aspect of the present invention, the content player on the end user's terminal contains a button that allows users to ask questions in real-time using asynchronous or live online lectures, wherein the question button on the content player allows users to ask a question that is time-stamped to a specific point in the lecture. Furthermore, the content player keeps a time-synced stream of questions available to the user, as well as providing visual cues within the virtual environment.

DETAILED DESCRIPTION OF THE INVENTION

The detailed description set forth below is intended as a description of the presently exemplary device provided in accordance with aspects of the present invention and is not intended to represent the only forms in which the present invention may be prepared or utilized. It is to be understood, rather, that the same or equivalent functions and components may be accomplished by different embodiments that are also intended to be encompassed within the spirit and scope of the invention.

Unless defined otherwise, all technical and scientific terms used herein have the same meaning as commonly understood to one of ordinary skill in the art to which this invention belongs. Although any methods, devices and materials similar or equivalent to those described can be used in the practice or testing of the invention, the exemplary methods, devices and materials are now described.

All publications mentioned are incorporated by reference for the purpose of describing and disclosing, for example, the designs and methodologies that are described in the publications that might be used in connection with the presently described invention. The publications listed or discussed above, below and throughout the text are provided solely for their disclosure prior to the filing date of the present application. Nothing herein is to be construed as an admission that the inventors are not entitled to antedate such disclosure by virtue of prior invention.

In order to further understand the goal, characteristics and effect of the present invention, a number of embodiments along with the drawings are illustrated as following:

The term "3D sensor" refers to devices which capture depth data with or without accompanying image data. Devices are also commonly referred to as depth or RGBD sensors. The use of 3D sensors within the invention is independent of the method used to obtain either the depth or image data. These methods include but are not limited to structured light, time-of-flight (TOF) and stereo.

Referring to FIGS. 1, 2, 3a and 3b, a virtual and augmented reality instruction system may come in a complete format 100 and a portable format 200/300. Both formats of the system achieve the same results with the exception that the portable format 200/300 computer generates the data it does not capture. Such data includes, but is not limited to, movement of users, objects (stationary and moving), environment geometry, and environment/background noise.

Figure 3A:
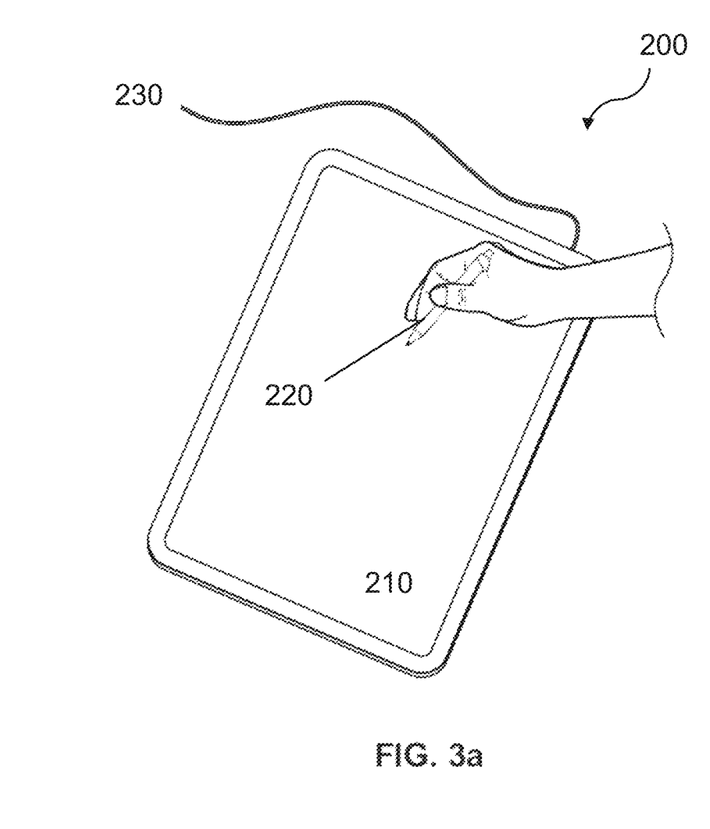
FIGS. 3a-3b illustrate one further aspect [portable] of a virtual and augmented reality instruction system in the present invention.

Referring to FIG. 3, a virtual and augmented reality instruction system in a portable format 200/300 may come in the following embodiments, which follow a data processing method, as outlined in FIG. 10, once data has been captured. In one embodiment shown in FIG. 3a, the handwriting can be tracked via any touch-enabled device 210 such as touch-screen displays or tablet devices. In such a case, the user may use his finger or a soft-tipped (mechanical) pen 220 to interact with the touch-enabled device 210. The audio may either be captured by the use of an external microphone 230 or a built-in microphone if available on the touch-enabled device 210.

Figure 3B:
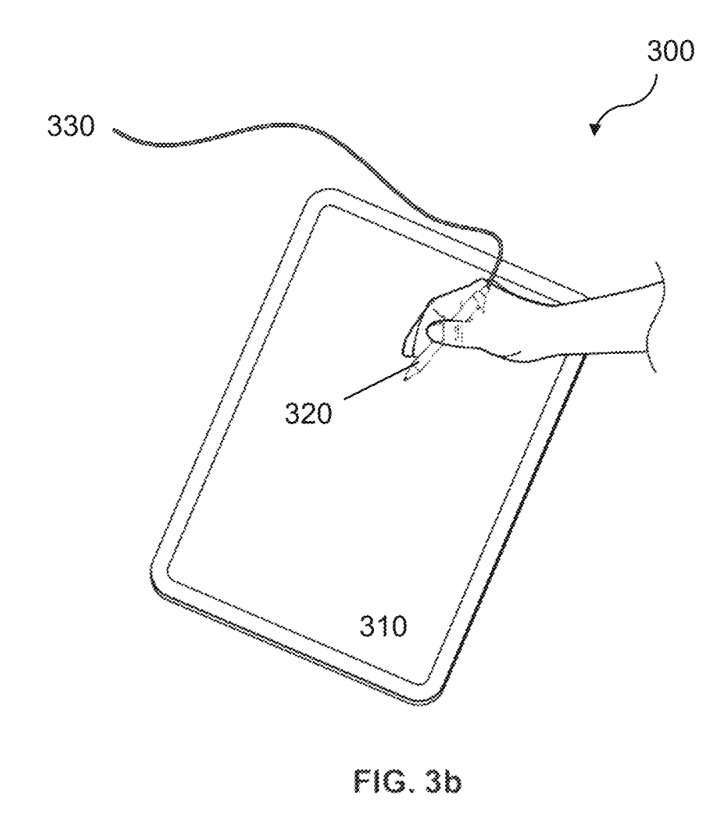

In a further embodiment shown in FIG. 3b, the handwriting can be tracked via a digital pen 320. In such a case, the user may be required to use paper 310 specific to the digital pen 320. The audio may either be captured by the use of an external microphone 330 or a built-in microphone if available on the digital pen 320.

Figure 10:
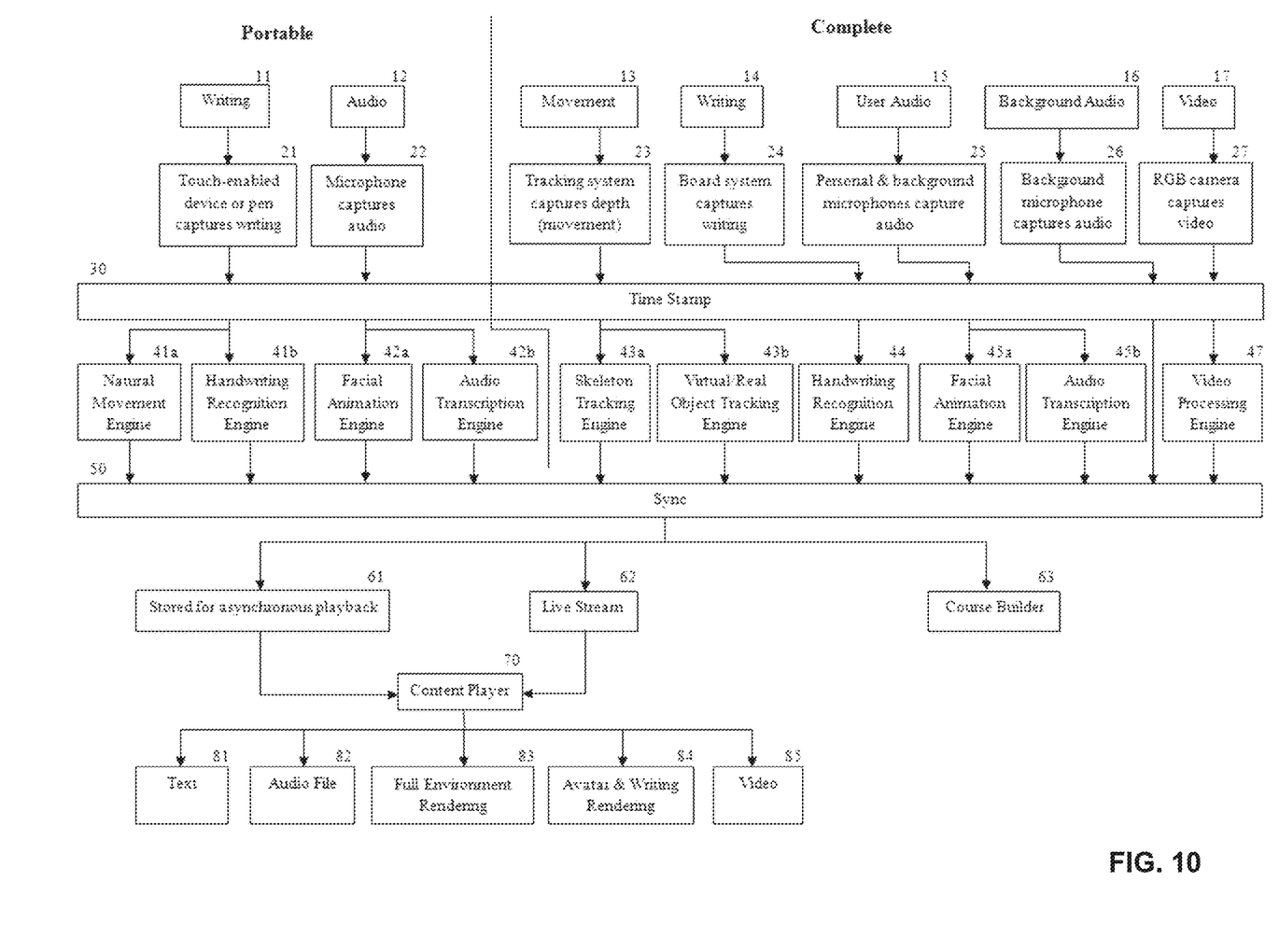
FIG. 10 illustrates the flow of data for all aspects of a virtual and augmented reality instruction system in the present invention.

Referring to FIG. 10, the data processing method for a virtual and augmented reality instruction system in a portable format 200/300 involves two types of data: writing 11 and audio 12. The touch-enabled device 210 or digital pen 320 captures the writing 21 and the microphone 230/330 captures the audio 22. The writing is captured at an approximate minimum frequency of 30 Hz, so the writing data captured is a stroke within a character or drawing. Next, the handwriting strokes and audio are time-stamped (30). The following step involves running the raw data through their respective engines. The time-stamped, handwriting strokes are processed through both a Natural Movement Engine (NME) 41a and a Handwriting Recognition Engine (HRE) 41b, and the time-stamped audio is processed through both a Facial Animation Engine (FAE) 42a and an Audio Transcription Engine (ATE) 42b. The NME 41a uses the position of the current handwriting stroke in relation to prior captured writing and the absolute boundaries of the device (or medium) used to capture the writing to interpolate the movement of the avatar within virtual space. The NME 41a also determines minute movements, both involuntary and voluntary, to supplement the interpolated movements; increasing the level of realism of the computer generated motion. Such minute movements include, but are not limited to, shifting weight between legs, directing avatar's focus towards written text, tapping, breathing, and etc. The HRE 41b combines the handwriting strokes over time and converts them into text and/or drawings. The HRE 41b outputs the current handwriting stroke and any new text or drawings it was able to decipher from prior handwriting strokes. The FAE 42a uses the audio captured by the microphone 230/330 to generate facial animations corresponding to the words spoke by the user, and the ATE 42b transcribes the user's speech from the microphone 230/330 into text. After the raw data has been processed by the various engines mentioned above, the data from each engine is synced (50) to its respective time-stamp. After the data is synced, both the portable 200/300 and complete 100 formats of a virtual and augmented reality instruction system will have identical data formatting and will therefore be treated the same. At this point, the processed data can be stored for asynchronous playback 61, streamed to the end-user 62, and/or outputted to a course building software 63.

Figure 1:
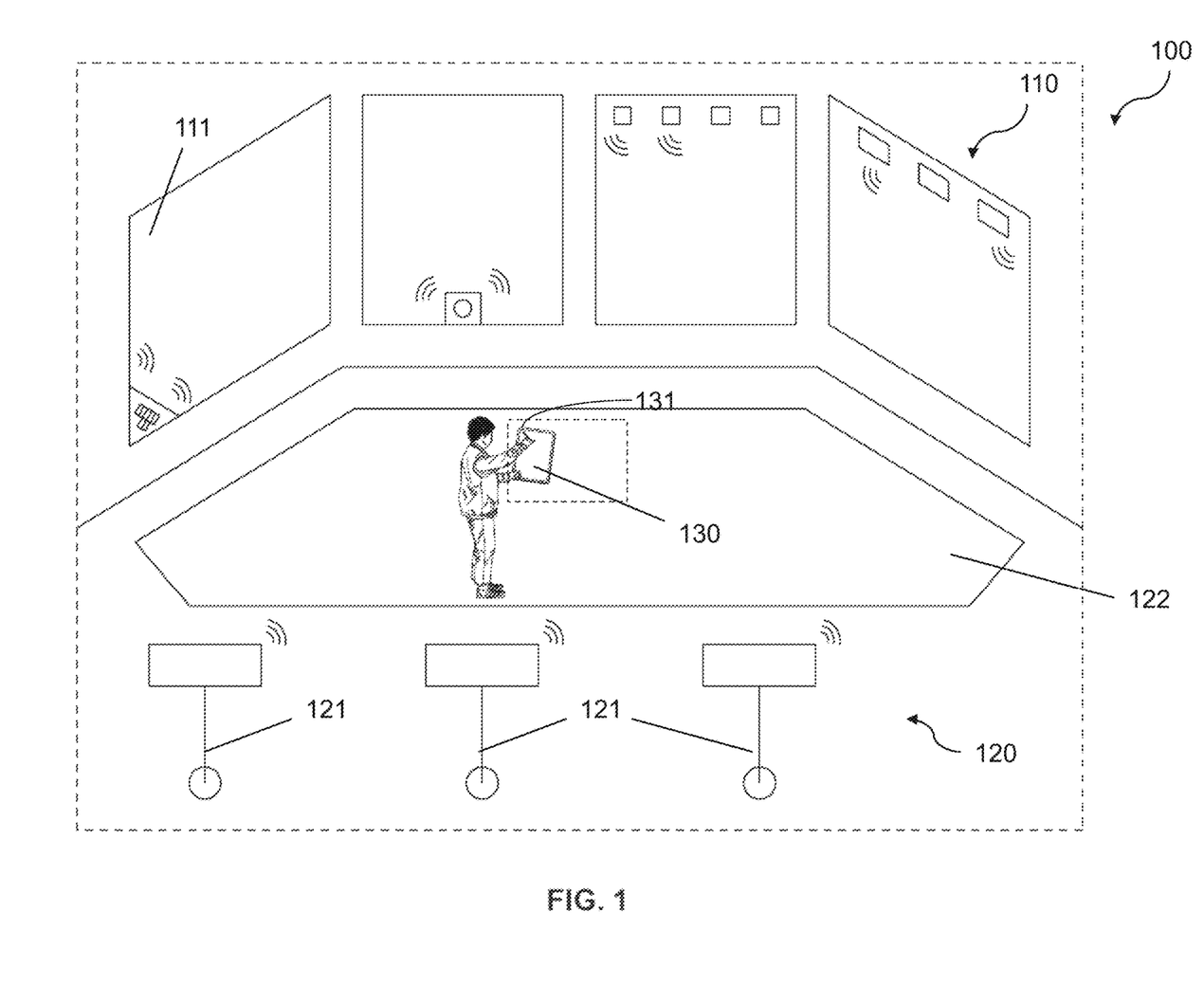
FIG. 1 illustrates one aspect [complete] of a virtual and augmented reality instruction system in the present invention.
Figure 2:
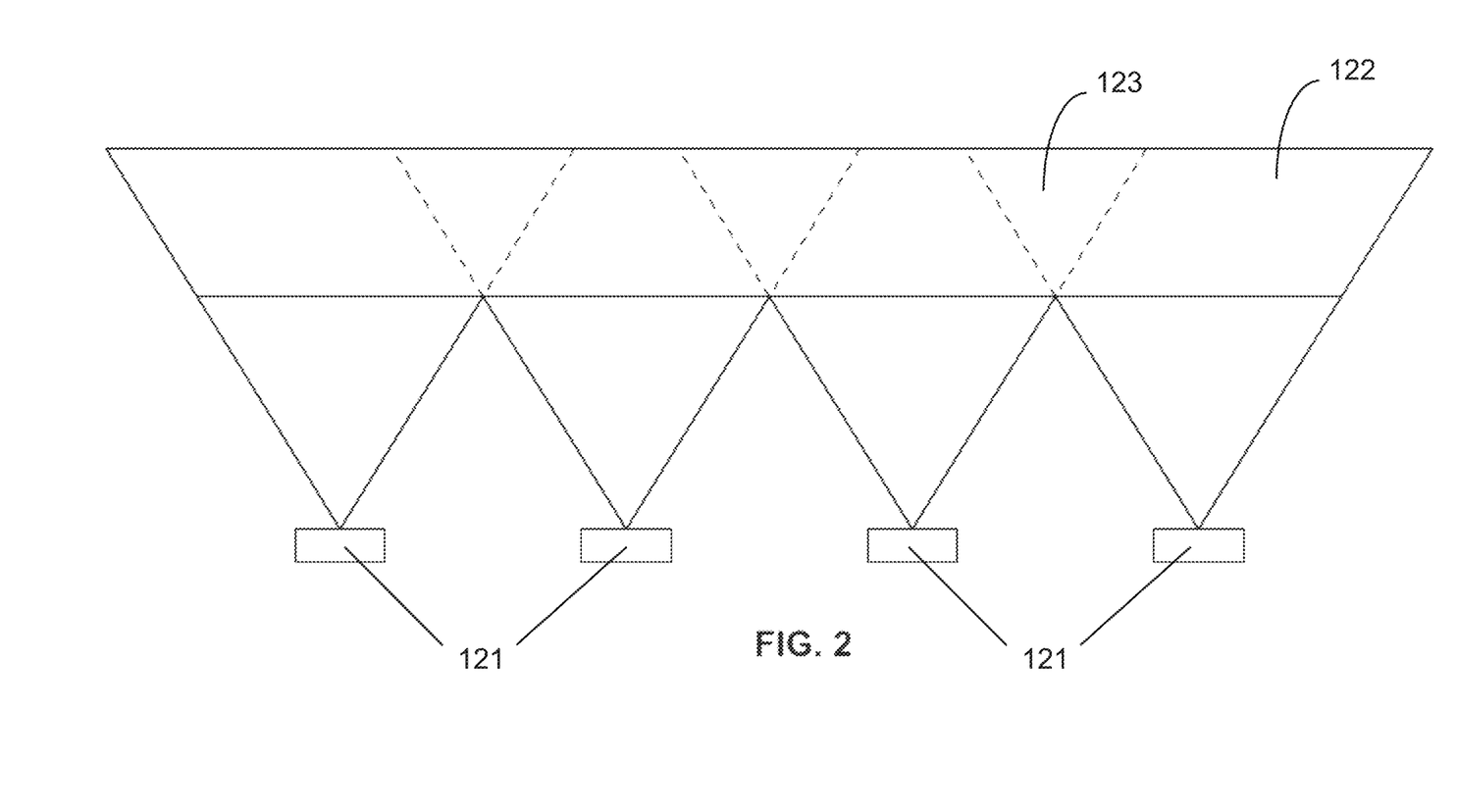
FIG. 2 illustrates the tracking system having one or more tracking units with overlapping field-of-views (FOV) in the present invention.

Referring to FIGS. 1 and 2, the virtual and augmented reality instruction system in a complete format 100 may include a board system 110 to capture all movements on the board's surface, and a tracking system 120 to capture all physical movements. The board system 110 and tracking system 120 can be used either individually or jointly. The board system 110 and the tracking system 120 can communicate with each other through a network, and control devices 130 (such as laptops, desktops, remote servers, mobile phones or tablets) can be used to control the board system 110 and tracking system 120 through the network as well.

In one embodiment, the board system 110 may include one or more board unit(s) 111, and a tracking region 122 may be defined in a predetermined distance from the board unit(s) 111. More particularly, the tracking region 122 is the total area where the tracking system 120 can track individual(s) in front of the board unit(s) 111. Within each board unit 111 is a computing device which determines the movements based on sensor outputs, and those movements are then transmitted to the controlling devices 130. Each board, such as a whiteboard or chalkboard, may have one or more units attached to its surface depending on the size of the board and configuration of the board unit 111. The tracking system 120 may include one or more tracking units 121 as well. Each tracking unit 121 is used to create a continuous field-of-view (FOV) or tracking region 122 among the sensors. This is achieved through the registration of the overlap regions 123 between the individual FOVs of each tracking unit 121, as can be seen in FIG. 2.

In an exemplary embodiment, each tracking unit 121 of the tracking system 120 is equipped with at least one 3D sensor, communicating with each other through the network, and is used to track the movement and speech of each individual in the tracking region 122. The sensors are configured to track the skeletons of each individual and used to map the environment of the tracking region. In other embodiments, the tracking system 120 can also track motion that is not part of the individual's skeleton. For example, the tracking system 120 can also track the movement of a moving object like a ball travelling in the air. Each tracking unit 121 can be equipped with a microphone to conduct speech capturing, motion tracking, and environment noise capturing.

Regarding the speech capturing, the process can be assisted by using additional microphones. In such an embodiment, the user would use a personal microphone 131 attached to a mobile computer (mobile phone or tablet) acting as a control device 130, as can be seen in FIG. 1. The personal microphone 131 would therefore act as the primary audio channel while the microphone within each tracking unit 121 would act as supplementary audio channels for the audio of a specific user.

Regarding mapping the environment of the tracking region 122, it may include analyzing the image and depth data produced by the sensor to determine what objects, besides the individuals, are present. These objects may include desks, chairs, trash cans, podiums, etc., which will then be re-created in the virtual environment displayed on the end user's computer.

Figure 4A:
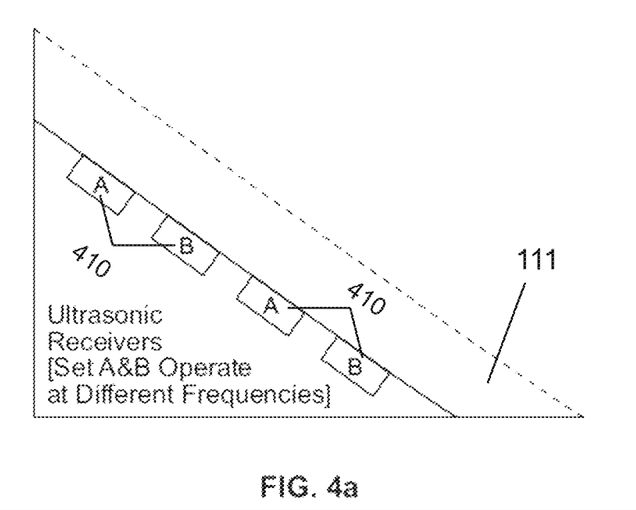
FIGS. 4a-4c illustrate an ultrasonic configuration attached to the board unit to detect movement (including writing and erasing) on the board's surface in the present invention.

In one embodiment of the board unit 111 shown in FIG. 4a, an ultrasonic configuration is shown. The ultrasonic configuration may include two or more pairs of ultrasonic receivers 410 attached to the board unit 111. The ultrasonic receivers 410 are in pairs as at least three points are needed for triangulation. Each pair of ultrasonic receivers 410 receive transmissions from a chalk, pen, or eraser holder transmitting at the same respective frequency. The triangulation determines the position of the chalk, pen, or eraser holder through the strength of the signal in relation to the location of the board unit 111.

Figure 4B:
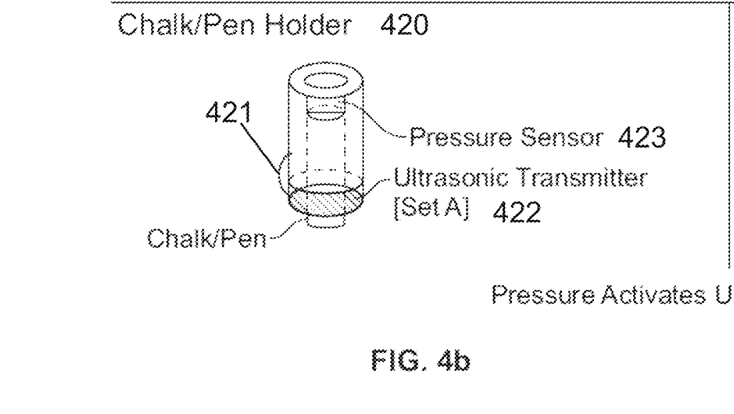

FIG. 4b shows a chalk/pen holder 420 having a trigger 421, ultrasonic transmitter 422, and pressure sensor 423. The trigger 421 is used to load/unload the pen/chalk from the holder, while the ultrasonic transmitter 422 is configured to send out a signal at the corresponding frequency of its receiver. The pressure sensor 423 determines when the holder is being used (pressure between board, chalk/pen, and sensor) and activates the signal transmission.

Figure 4C:
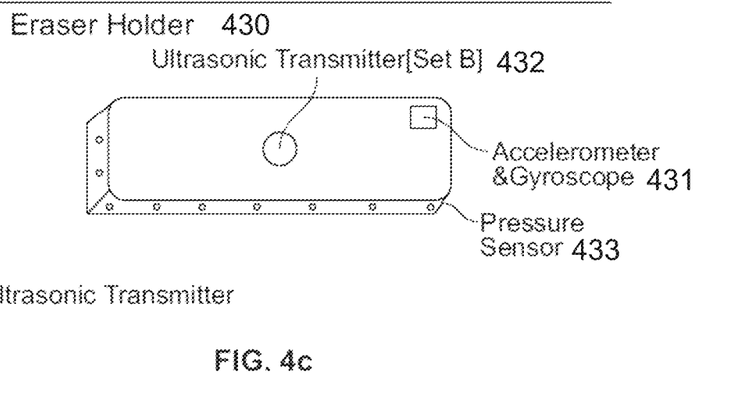

FIG. 4c shows an eraser holder 430 having an accelerometer and gyroscope 431, ultrasonic transmitter 432, and pressure sensor 433. The accelerometer and gyroscope 431 are used to determine the erasers' orientation, because the signal transmission is orientation independent, while the ultrasonic transmitter 432 sends out a signal at the corresponding frequency of its receiver. The pressure sensor 433 determines when the holder is being used (pressure between the board, eraser, and sensor) and activates the signal transmission. In an exemplary embodiment, pairs of ultrasonic receivers 410 can be attached to a board unit 111 to detect movements (writing/erasing) on the board's surface, and the pen/chalk holder 420 and eraser 430 are used to transmit movements (writing/erasing).

Figure 5A:
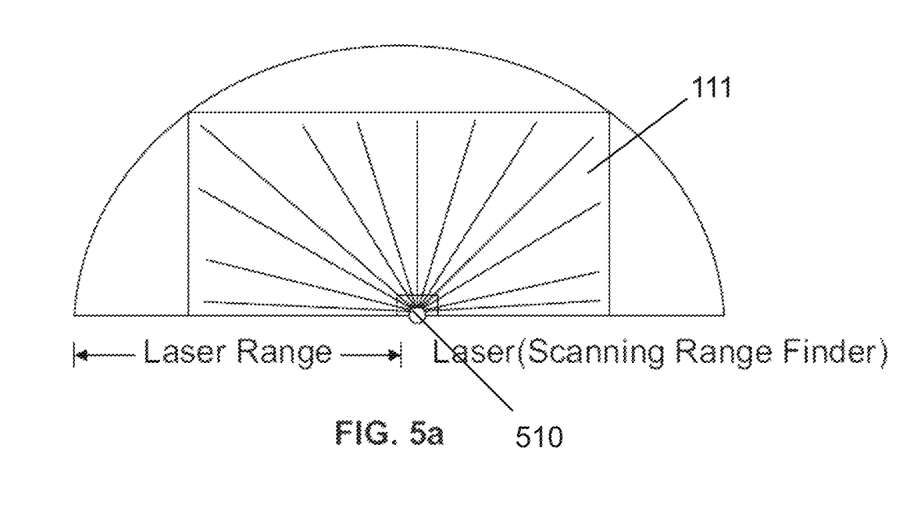
FIGS. 5a-5c illustrate a laser configuration attached to the board unit to detect movement (including writing and erasing) on the board's surface in the present invention.
Figure 5B:
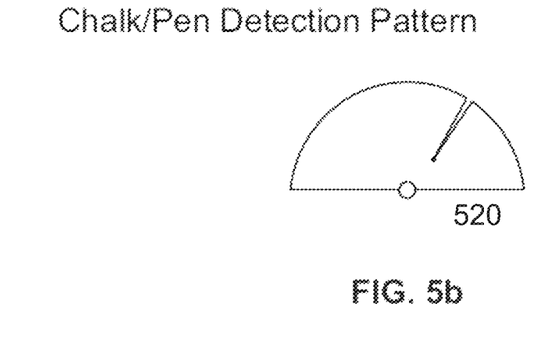
Figure 5C:
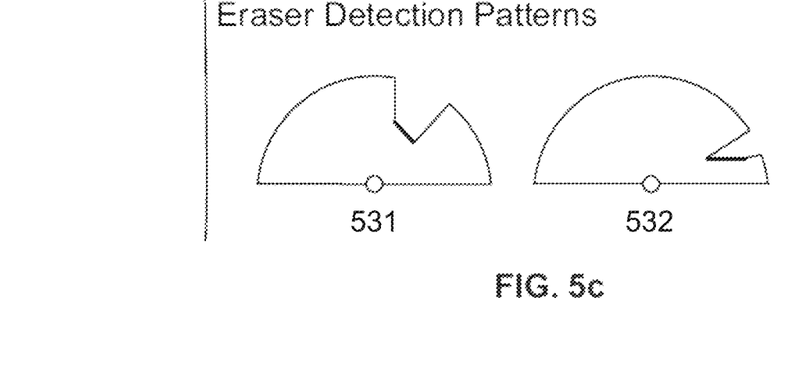

In another embodiment of the board unit 111 shown in FIG. 5a, a scanning range finder laser 510 can be attached to the board unit 111 to detect movement (including writing and erasing) on the board's surface. The scanning range finder laser 510 can make multiple scans of the board unit 111 per second. Each scan will provide a 180-degree range pattern that is used to determine the presence and movement of chalk, pens (520), or erasers (531, 532), as shown in FIGS. 5b and 5c. Because this configuration is based on patterns, not triangulation, no additional holders are required since we are testing for the geometry of chalk, pens, and erasers in the range pattern from each scan, from which the detection patterns are analyzed to detect movements (writing/erasing).

Figure 6A:
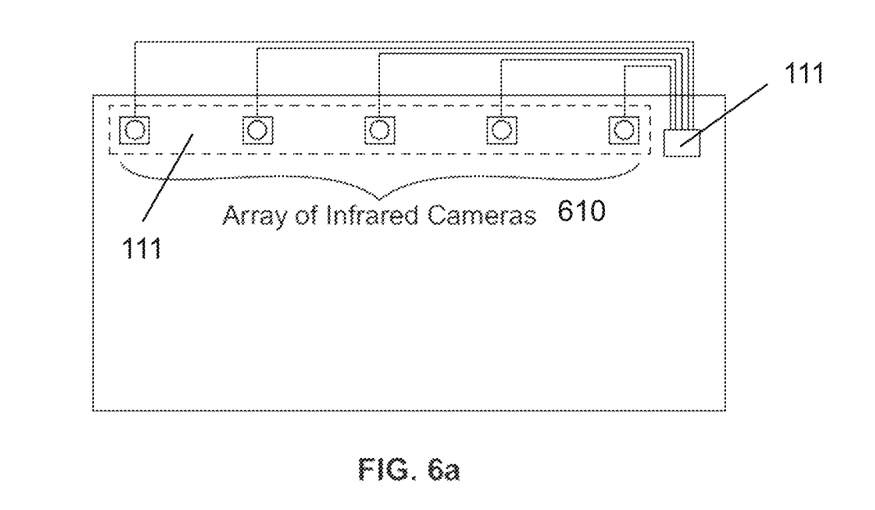
FIGS. 6a-6c illustrate an infrared configuration attached to the board unit to detect movement (including writing and erasing) on the board's surface in the present invention.

In still another embodiment of the board unit 111, an infrared configuration is shown in FIG. 6a, which includes an array of infrared cameras 610 attached to the board unit 111. The infrared cameras 610 are arranged with their FOVs overlapping to prevent gaps in detection on the board's surface. The triangulation determines the position of the chalk, pen, or eraser holder through the strength of the infrared light in relation to the location of the infrared camera 610 that detects it.

Figure 6B:
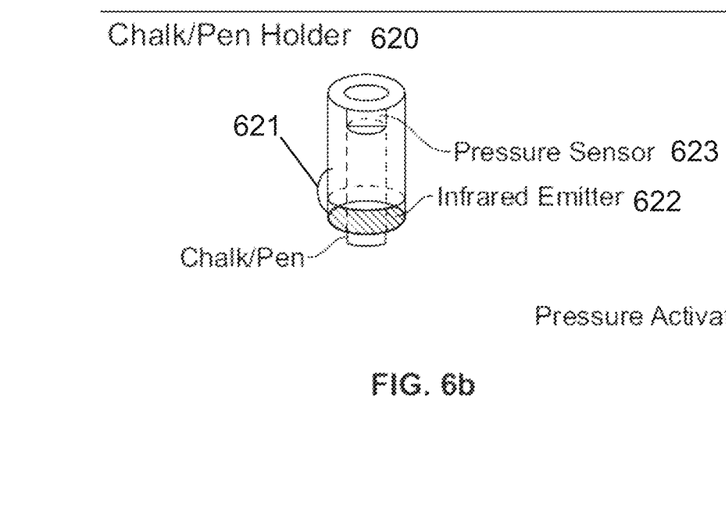

Similar to FIG. 4b, FIG. 6b shows a chalk/pen holder 620 having a trigger 621, infrared emitter 622, and pressure sensor 623. The trigger 621 is used to load/unload the pen/chalk from the holder, while the infrared emitter 622 sends out infrared light. The pressure sensor 623 determines when the holder is being used (pressure between board, chalk/pen, and sensor) and activates the infrared emitter 622 of the chalk/pen holder 620.

Figure 6C:
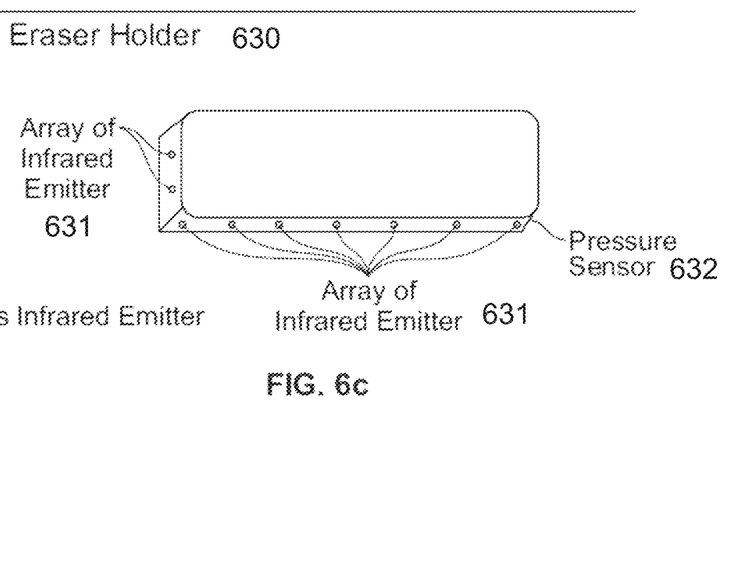

Furthermore, an eraser holder 630 may include an array of infrared emitters 631 and a pressure sensor 632. The array of infrared emitters 631 is positioned around the eraser holder 630, so the board unit 111 will be able to distinguish the pen/chalk from the eraser because the eraser's infrared light will be captured in a linear shape in contrast to the single point generated by the pen/chalk. The pressure sensor 632 determines when the holder is being used (pressure between board, eraser, and sensor) and activates the infrared emitter. In an exemplary embodiment, the array of infrared cameras 611 can be attached to the board unit 111 to detect movements (writing/erasing) on the board's surface, and the pen/chalk holder 620 and eraser 630 are used to transmit movements (writing/erasing).

Figure 7A:
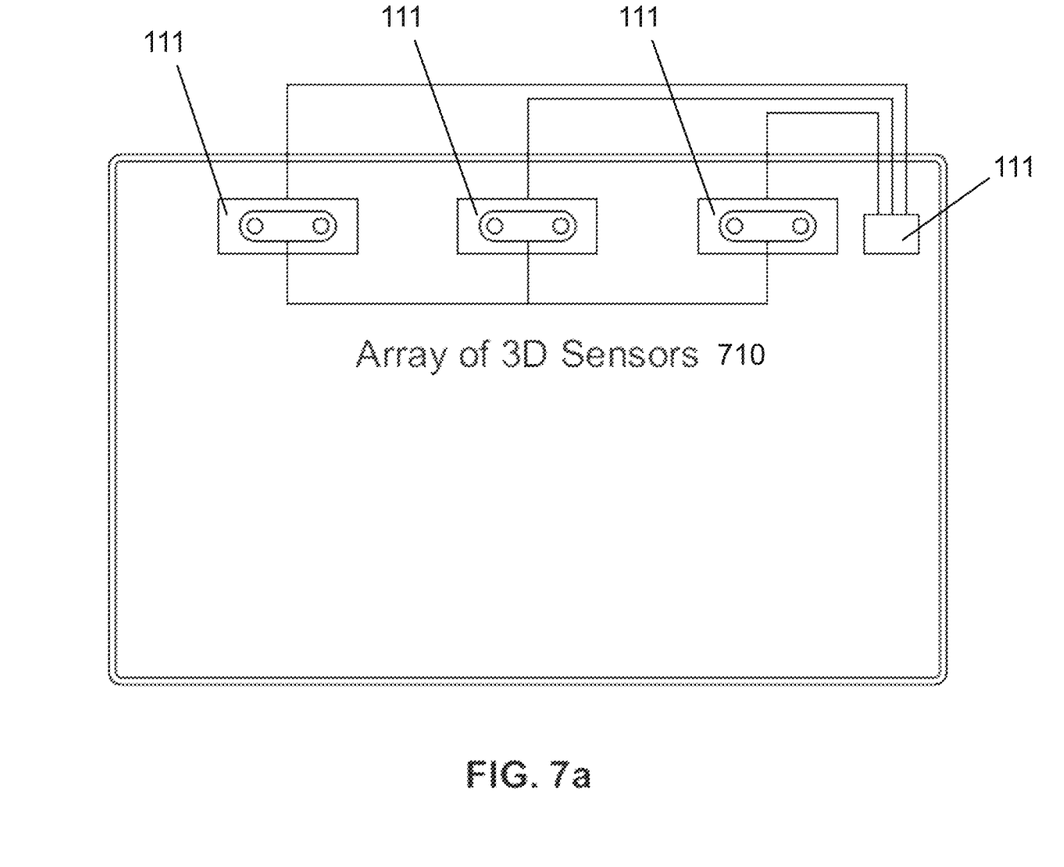
FIGS. 7a-7b illustrate a 3D sensor configuration attached to the board unit to detect movement (including writing and erasing) on the board's surface in the present invention.

In another embodiment of the board unit 111 shown in FIG. 7a, a 3D (three-dimensional) sensor 710 can be attached to the board unit 111 to detect movement (including writing and erasing) on the board's surface. The 3D sensors 710 are arranged with their FOVs overlapping to prevent gaps in detection on the board's surface. In order to track the position when writing/erasing, the captured depth/image data is processed through a hand tracking algorithm, which is a subset of the Skeleton Tracking Engine 43a shown in FIG. 10. Upon acquiring the location of the user's hand, the depth/image data is further processed to determine if the user is holding an eraser or chalk/pen. Next, the distance between the eraser or chalk/pen is tested to determine if it is in use. Because this configuration is based on hand tracking, no additional holders are required since we are analyzing the depth/image data produced by the 3D sensor 710 to detect movements (writing/erasing).

Figure 7B:
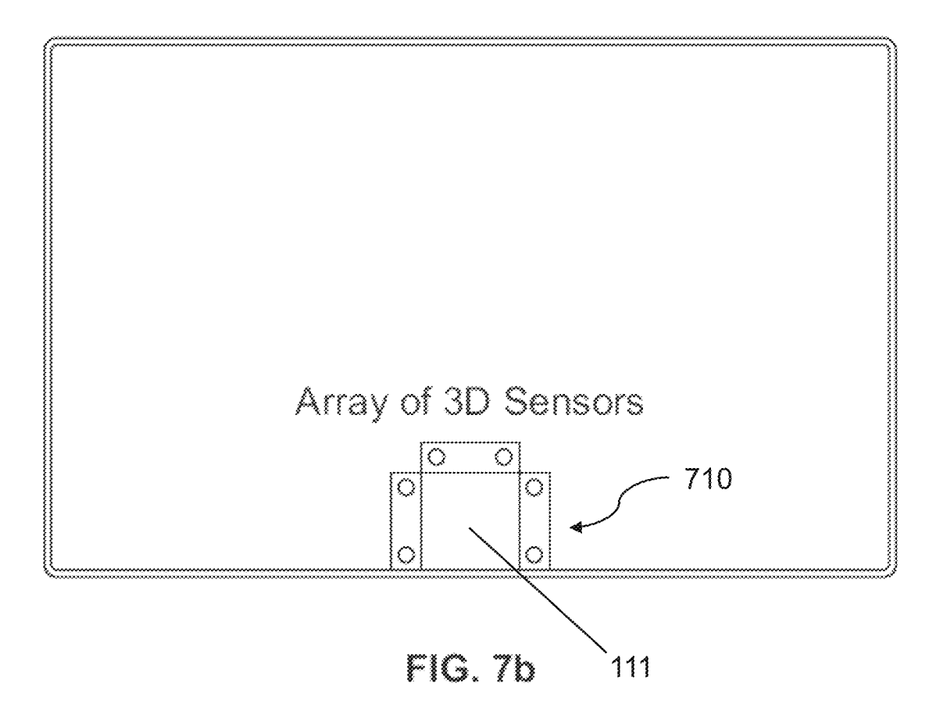

In yet another embodiment of the board unit 111 shown in FIG. 7b, a group of 3D sensors 710 can be attached to the board unit 111. The 3D sensors 710 are arranged in an arc of 180 degrees. For example, three 3D sensors 710 would be required if each 3D sensor 710 had a horizontal field-of-view of 60 degrees. In order to detect writing/erasing, the board unit 111 analyzes the volume of depth data immediately above the board's surface. The resulting data will provide a 180-degree range pattern identical to those in FIGS. 5b and 5c. The range pattern is used to determine the presence and movement of chalk, pens, or erasers. Because this configuration is based on patterns, not triangulation, no additional holders are required since we are testing for the geometry of chalk, pens, and erasers in the range pattern from each analysis, from which the detection patterns are analyzed to detect movements (writing/erasing).

The aforementioned embodiments of the board unit 111 and their corresponding figures are single representations for the use of ultrasonic, laser, infrared, and 3D sensors. The position, rotation, and combination of sensors may differ according to the size and shape of the board's (whiteboard or chalkboard) surface, as well as lighting conditions of the environment.

Figure 8:
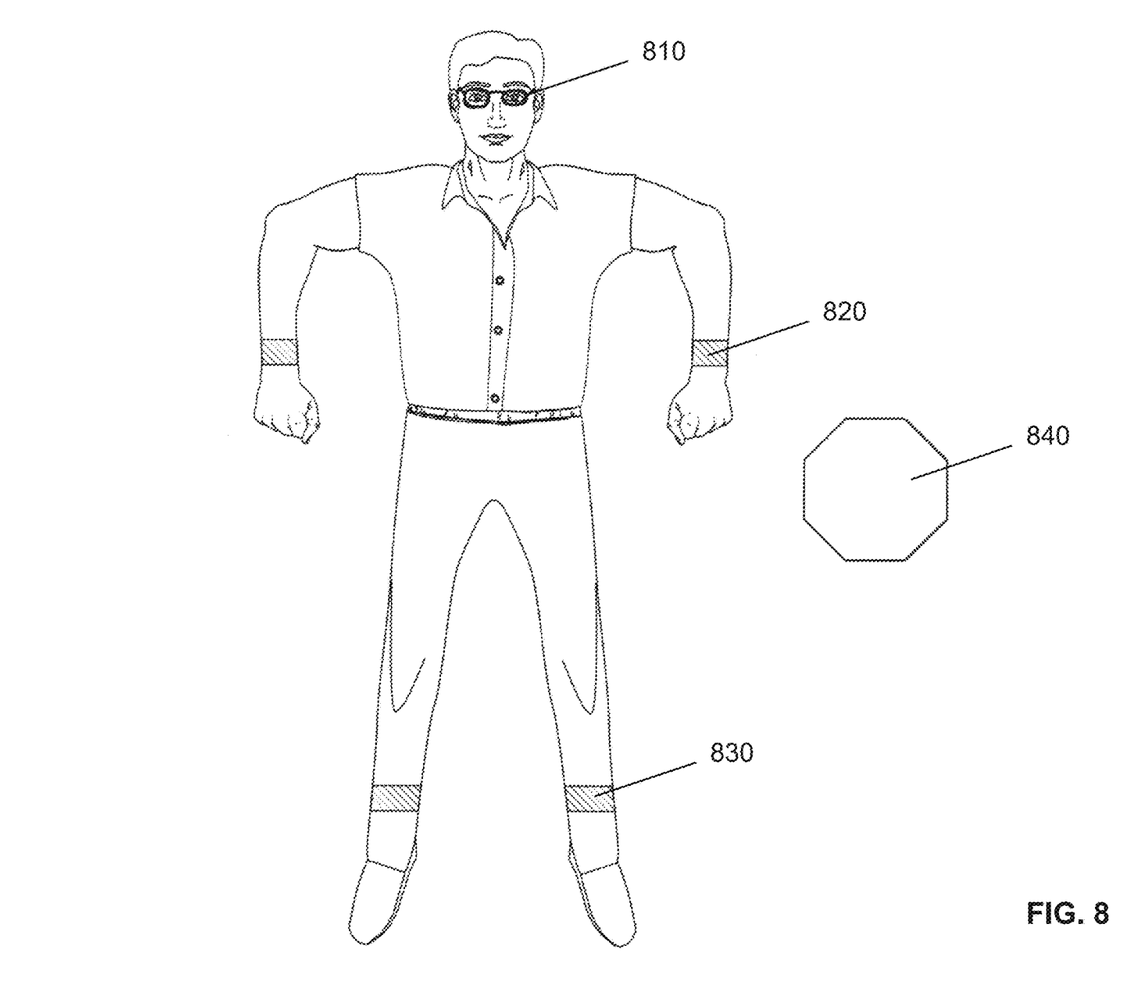
FIG. 8 illustrates the use of augmented reality within the tracking system in the present invention.

Using the interactive information input and retrieval system in a complete format 100 with augmented reality glasses 810, a cost-effective system for augmented reality can be implemented as shown in FIG. 8. In particular, the augmented reality glasses 810 needs to be transparent with an integrated display in order to allow the user to continue navigating in real space without obstructed vision. More importantly, the augmented reality glasses will not require an additional camera, which is usually a requirement, due to the existence of the tracking system 120. The augmented reality glasses 810, which are worn by the user, will display the virtual representation of an object 840 within the tracking region 122. This is achieved due to the tracking system (120)'s constant awareness of the user's location & orientation and geometry of the environment. Therefore, the virtual object can be free to be positioned or moved anywhere within the tracking region 122. For example, the virtual object (840)'s position can be fixed in front of the user, regardless of the user's movements, therefore allowing the user quick & easy access to the object throughout the tracking region 122. The tracking system 120 will then allow the instructor to interact with the virtual object 840 by tracking the user's movements and translating them onto the virtual object 840. The virtual object 840 can also be bound by the laws of physics therefore the forces translated onto it will be proportional to the user's movement. The interaction between the user and the virtual object 840 will then be displayed on the end user's computer.

In a further embodiment, the user can supplement the tracking system 120 with wearable motion controllers or markers to enable finer motion control. The 3D sensors within each tracking unit 121 have a finite degree of accuracy and certain scenarios may require increased accuracy. Such an example includes interacting with virtual objects via augmented reality. Therefore, FIG. 8 shows the user wearing four additional motion sensors on his arms 820 and legs 830. These sensors will supply additional data to the Skeleton Tracking Engine 43a allowing more subtle and accurate movements to be captured.

Referring to FIG. 10, the data processing method for a virtual and augmented reality instruction system in a complete format 100 may include five types of data: movement 13, writing 14, user audio 15, background audio 16, and video 17. Each type of data is captured in the following manners:

The tracking system 120 captures the depth data (movement). (23)

The board system 110 captures the writing. (24)

The microphone 131 connected to a mobile control device 130 captures the user audio and is supplemented by the microphone within each tracking unit 121. (25)

The microphone within each tracking unit 121 captures the background audio. (26)

The RGB camera within the 3D sensor in each tracking unit 121 captures video. (27)

The writing is captured at an approximate minimum frequency of 30 Hz. Therefore the writing data captured is a stroke within a character or drawing. The movement captured by the tracking system 120 is in the form of depth data. Each frame of data consists of a map of depth values. Next, the depth frames, handwriting strokes, user audio, background audio, and video frames are time-stamped (30). The following step involves running the raw data through their respective engines.

The time-stamped depth frames are processed through a Skeleton Tracking Engine (STE) 43a and Object Tracking Engine (OTE) 43b. The STE identifies the skeletons of users within each frame of data. The skeleton data is then shared with the OTE 43b, which captures the movements of non-skeleton objects and calculates the position, rotation, and velocity of virtual objects.

The time-stamped, handwriting strokes are processed through a Handwriting Recognition Engine (HRE) 44. The HRE 44 combines the handwriting strokes over time and converts them into text and/or drawings. The HRE 44 outputs the current handwriting stroke and any new text or drawings it was able to decipher from prior handwriting strokes.

The time-stamped user audio is processed through a Facial Animation Engine (FAE) 45a and Audio Transcription Engine (ATE) 45b. The FAE uses the audio captured by the microphone to generate facial animations corresponding to the words spoke by the user, and the ATE transcribes the user's speech into text.

The time-stamped video frames are processed through a Video Processing Engine (VPE) 47. The VPE 47 registers the frames from each tracking unit 121 together and compresses the resulting data.

After the raw data has been processed by the various engines stated above, the data from each engine and background audio are synced (50) to their respective time-stamps. After the data is synced, both the portable 200/300 and complete 100 formats of a virtual and augmented reality instruction system will have identical data formatting and will therefore be treated the same. At this point, the processed data can be stored for asynchronous playback 61, streamed to the end-user 62, and/or outputted to a course building software 63.

Outputting the processed data to a course building software 63, allows the user to preview the re-created virtual environment and make changes. For example, the user can re-enact certain portions of the session or re-write some of the writing using only the portable format 200/300 or the board system 110. Furthermore, the user can also make changes to the environment and his avatar to his preference.

Outputting the processed data to either a live stream 62 or storing for asynchronous playback 61, may include sending the data to a content player 70 on the end-user's computer. The content player 70 serves the data in the following formats:

Text 81: The end-user will have access to a stream of both the handwritten and text data for use when only the text is necessary.

Audio 82: The end-user will have access to a stream of the audio data of the entire session for use when visual playback is not necessary.

Partial Rendering 84: The end-user will have access to a stream of the handwritten data in the representation of writing on a board, or paper. This will be accompanied by the rendering of a 3D avatar. The avatar will be controlled by the audio, motion, and facial animation data generated. The 3D avatar may either be rendered completely or partially such as, a talking head.

Full Rendering 83: The end-user will have access to a stream of all the data generated, which is used to virtually re-create the entire environment as it existed. Each user will be represented as a 3D avatar.

Video 85: The end-user will have access to a stream of the video data generated.

The viewing of video 85, partial rendering 84, and full rendering 83 within the content player 70 will allow the end-user to manipulate his perspective of the session while viewing the content. This is due to the multiple tracking units 121 across the tracking region 122, so the end-user can view the session from various angles and positions.

Figure 9:
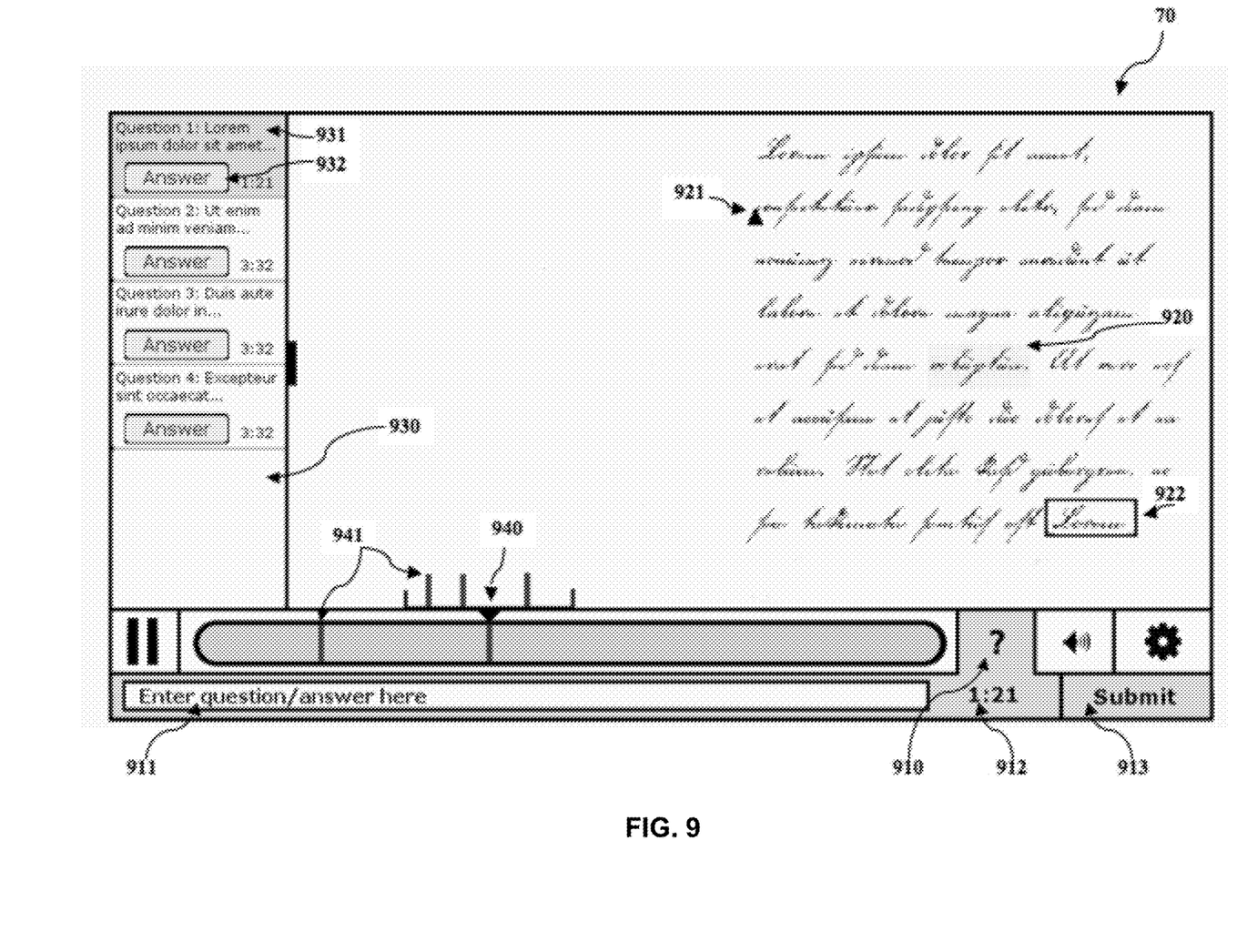
FIG. 9 illustrates a question button on the content player that allows users to ask questions in real-time using asynchronous or live online lectures, wherein the question button on the content player allows users to ask a question that is time-stamped to a specific point in the lecture.

The content player 70 can include a question button 910 that allows end-users to ask questions in real-time using asynchronous or live online lectures. FIG. 9 is one embodiment of the content player 70 being used to display a text stream 81. Here, end-users will also be able to help other end-users by answering questions that they know the answer while watching the lecture, resulting in reinforced learning. The question button 910 allows end-users to ask a question that is time-stamped to a specific point in the lecture. Clicking the button results in the appearance of a text-field 911 with a time-stamp 912 corresponding to that point in the lecture and a submission button 913. The content player 70 can also display prior questions in three ways. In a first embodiment, ticks 941 are shown on the timeline to indicate when a question was asked. Furthermore, if multiple questions were asked at specific points, the ticks are expanded above the timeline (zoom above timeline) 940. In a second embodiment, the content player 70 can also display prior questions by marking the text or objects in the virtual environment. Such markings may include highlighting 920, ticks 921, or outlining 922. In a third embodiment, a time-synced stream 930 can display questions on the side of the content player 70. The area corresponding to each question 931 will be clickable allowing the browser to focus the page to a new window or section of the current window where an expanded view of the question and its answers are displayed. Each question within the time-synced stream 930 contains an "Answer" button 932 allowing the end-user to answer the question in the same manner in which questions are asked 911, 912, 913. Furthermore, hovering over or selecting markings or ticks in the first two embodiments results in the time-synced stream 930 scrolling to the respective question(s). In addition, hovering over or selecting the clickable area of a question 931 results in the markings 920, 921, 922 (of the second embodiment) of the corresponding question becoming highlighted and/or focused; allowing the end-user to easily focus on the source of the question.

Having described the invention by the description and illustrations above, it should be understood that these are exemplary of the invention and are not to be considered as limiting. Accordingly, the invention is not to be considered as limited by the foregoing description, but includes any equivalents.

What is claimed is:

1. A virtual and augmented reality instruction system for virtually recreating an environment from captured movement, depth, audio and video, the virtual and augmented reality instruction system in a complete format and comprising:
   a board system, comprising of one or more pen-enabled boards, to capture all movements on a surface of each board in the board system;
   a tracking system, comprising of one or more tracking units equipped with a microphone and three-dimensional (RGBD) sensor, from which a tracking region is established up to a predetermined distance from the board system, to capture all movement of objects and individuals and individuals' speech; and,
   a control device, the board system and tracking system being configured to communicate with each other over a network and being controlled by the control device through the network, the virtual and augmented reality instruction system being configured to process and sync through various engines sensor output to generate processed data representing writing, erasing, position, orientation, skeleton, speech, background noise, and geometry, allowing to virtually recreate the environment comprised of the boards and the individuals and objects in the tracking region.

2. The virtual and augmented reality instruction system of claim 1, wherein transparent augmented reality glasses are used to display virtual objects within the tracking region.

3. The virtual and augmented reality instruction system of claim 1, wherein the engines comprise a (i) Skeleton Tracking Engine, identifying skeletons of individuals; (ii) Object Tracking Engine, identifying position, rotation, and velocity of real and virtual objects; (iii) Handwriting Recognition Engine, converting handwriting strokes into text or drawings; (iv) Facial Animation Engine, generating facial animations from an individual's captured speech; (v) Audio Transcription Engine, transcribing an individual's captured speech into text; and (vi) Video Processing Engine, registering and compressing the video frames from each RGBD sensor.

4. The virtual and augmented reality instruction system of claim 1, wherein the processed data is rendered on a content player which virtually re- creates a captured environment in formats including (i) Text-Only, comprising of handwriting and text data; (ii) Audio-Only, comprising of audio data; (iii) Partial Rendering, comprising of a rendering of handwriting on virtual paper or boards and a virtual avatar controlled by audio, motion, and facial animation data; and (iv) Full Rendering, comprising of a rendering of the entire environment using all data captured and processed.

5. The virtual and augmented reality instruction system of claim 4, wherein the content player includes a question button, and said question button time-stamps questions to a specific time, marks the timeline, marks text or objects within the virtual environment, and organizes questions within a time-synced stream corresponding to the rendered content.

6. The virtual and augmented reality instruction system of claim 1, wherein the processed data representing the captured environment is modified by a course building software comprising changes to the appearance of the environment and avatars, rewrites of handwriting data, and reenactments using the complete format.

7. A virtual and augmented reality instruction system for virtually recreating an environment from captured movement and audio, the virtual and augmented reality instruction system in a portable format and comprising:
- a touch-enabled display or digital pen to capture all movements on a surface of the display or of a medium specific to the digital pen;
- a microphone to capture audio; and,
- a computing device, the virtual and augmented reality instruction system being configured to process and sync through various engines sensor output to generate processed data representing writing, erasing, speech, and avatar movement, allowing to virtually recreate an environment comprised of the surface and computer generated geometry, avatars, and objects.

8. The virtual and augmented reality instruction system of claim 7, wherein the engines comprise a (i) Natural Movement Engine, generating avatar movement from captured handwriting; (ii) Handwriting Recognition Engine, converting handwriting strokes into text or drawings; (iii) Facial Animation Engine, generating facial animations from an individual's captured speech; and (iv) Audio Transcription Engine, transcribing an individual's captured speech into text.

9. The virtual and augmented reality instruction system of claim 8, wherein the Natural Movement Engine interpolates the movement of an avatar within virtual space from the position of the current handwriting stroke in relation to prior captured writing and the absolute boundaries of the surface.

10. The virtual and augmented reality instruction system of claim 7, wherein the processed data is rendered on a content player which virtually re-creates a captured environment in formats including (i) Text-Only, comprising of handwriting and text data; (ii) Audio-Only, comprising of audio data; (iii) Partial Rendering, comprising of a rendering of handwriting on virtual paper or boards and a virtual avatar controlled by audio, motion, and facial animation data; and (iv) Full Rendering, comprising of a rendering of the entire environment using all data captured and processed.

11. The virtual and augmented reality instruction system of claim 10, wherein the content player includes a question button, and said question button time-stamps questions to a specific time, marks the timeline, marks text or objects within the virtual environment, and organizes questions within a time-synced stream corresponding to the rendered content.

12. The virtual and augmented reality instruction system of claim 7, wherein the processed data representing the captured environment is modified by a course building software comprising changes to the appearance of the environment and avatars, rewrites of handwriting data, and reenactments using the portable format.

* * * * *